United States Patent [19]

Verbunt

[11] Patent Number: 4,741,095
[45] Date of Patent: May 3, 1988

[54] METHOD OF MANUFACTURING MAGNETIC HEAD CORES

[75] Inventor: Johannes P. M. Verbunt, Eindhoven, Netherlands

[73] Assignee: U.S. Philips Corporation, New York, N.Y.

[21] Appl. No.: 855,531

[22] Filed: Apr. 23, 1986

[30] Foreign Application Priority Data

Sep. 30, 1985 [NL] Netherlands ............ 8502664

[51] Int. Cl.⁴ ............................................. G11B 5/127
[52] U.S. Cl. ..................................... 29/603; 225/93.5; 219/121 LN
[58] Field of Search ............. 29/603; 360/119; 225/2, 225/93.5; 219/121 LG, 121 LN

[56] References Cited

U.S. PATENT DOCUMENTS

| | | | |
|---|---|---|---|
| 2,836,881 | 6/1958 | Pollock | 29/603 |
| 2,864,013 | 12/1958 | Wood | 319/368 |
| 3,104,455 | 9/1963 | Frost | 29/603 |
| 3,283,396 | 11/1966 | Pfost | 29/603 |
| 3,587,956 | 6/1971 | Oelke | 225/93.5 |

FOREIGN PATENT DOCUMENTS 2715352 10/1978 Fed. Rep. of Germany ........ 29/603
1570010 6/1980 United Kingdom .

*Primary Examiner*—P. W. Echols
*Attorney, Agent, or Firm*—F. Brice Faller

[57] ABSTRACT

A method of manufacturing magnetic head cores is provided in which a plurality of separate magnetic head cores is cut from a one-piece ferrite core block. A winding aperture is provided in each magnetic head core. A fracture in the cross-section of the material of the head core is generated by the winding aperture and the future tape contact face during or after the winding aperture is provided. A non-magnetic material in a liquid form is provided between the fracture faces and is converted to the solid form.

8 Claims, 3 Drawing Sheets

METHOD OF MANUFACTURING MAGNETIC HEAD CORES

BACKGROUND OF THE INVENTION

The invention relates to a method of manufacturing magnetic head cores in which a plurality of magnetic head cores is cut from a preprocessed ferrite core block.

In the prior art methods of manufacturing ferrite magnetic heads the side faces of two ferrite sub-blocks, one of which accommodates a winding aperture, are first lapped. Quartz is then sputtered on the side faces thus preprocessed and the sputtered faces of the sub-blocks are cemented together by means of glass. A plurality of magnetic head cores is then cut from the core block so obtained, each divided into two parts by a glass gap. The required electrical turns are wound in the winding apertures of the separate head cores in a later manufacturing stage. The lapping process is costly, because it requires great accuracy and is time-consuming, while a technical drawback of the lapping operation of the gap faces is that a damaged layer is formed on the gap faces. A further drawback is that the finished magnetic head cores consist of two halves cemented together by a thin glass layer, rendering them mechanically weak.

SUMMARY OF THE INVENTION

It is an object of the invention to provide a bulk manufacturing method which is inexpensive, leaves the gap faces intact and leads to a mechanically strong magnetic head core.

To this end the separate magnetic head cores are provided with a gap after they have been cut from a one-piece core block by a method in which a winding aperture is first provided in each magnetic head at a distance from the future tape contact face, which distance is at least substantially equal to the desired gap height. A fracture is then generated in a cross-section of the core material located between the future tape contact face and the winding aperture. A non-magnetic material in a liquid form is then provided between the fracture faces and, finally, the non-magnetic material is converted to the solid form.

By considering the gap in the magnetic core to be a defined crack, a technology can be developed which is fast, continuous, inexpensive and accurate.

It is found that under normal ambient conditions a defined crack can be created in a (monocrystalline) block of ferrite with the aid of simple means particularly thermomechanical means. When there is a brittle fracture, the fracture faces constitute a very accurate equidistant gap whose width can be adjusted in a manner to be indicated.

It will be evident that this technology is extremely suitable for inexpensive and accurate bulk manufacture.

Within the scope of the invention the core block may be (pre-)formed in a special manner. The future tape contact face of the ferrite core block may be provided with a longitudinal v-shaped notch. Notching is effected over the areas where the weakest cross-section will be present in the magnetic head cores to be sawn from the core block to facilitate the generation of a fracture in the magnetic head cores. The upper side of the core block should have such a surface quality that the notch to be provided is dominant and will thereby function as a fracture initiator. A tensile stress on the tip of the notch brings about the desired crack growth. The desired local stress condition may be produced in different manners.

In a first manner it is produced during the laser process of manufacturing the winding aperture. This is notably the case for relative small gap heights.

A second manner is to provide a temperature gradient across the head core, for example, by unilaterally heating it after the winding aperture has been provided in the solid magnetic head core. This approach may be necessary for cores having larger gap heights.

In both manners it may be advantageous to previously constrict the magnetic head core at the area of the desired gap. The fracture is then produced more easily in the case of cores having thicknesses of less than 200 $\mu$m, for example, a thickness of approximately 150 $\mu$m. The fracture process can also be performed without the core being previously constricted. Constriction to the desired track width may then be effected afterwards, which involves different and entirely specific advantages.

When the fracture is formed, it is opened as far as is required to realise the desired gap length and a non-magnetic gap filler such as epoxy penetrant is provided.

DESCRIPTION OF THE INVENTION

Figures 1A, 1B:
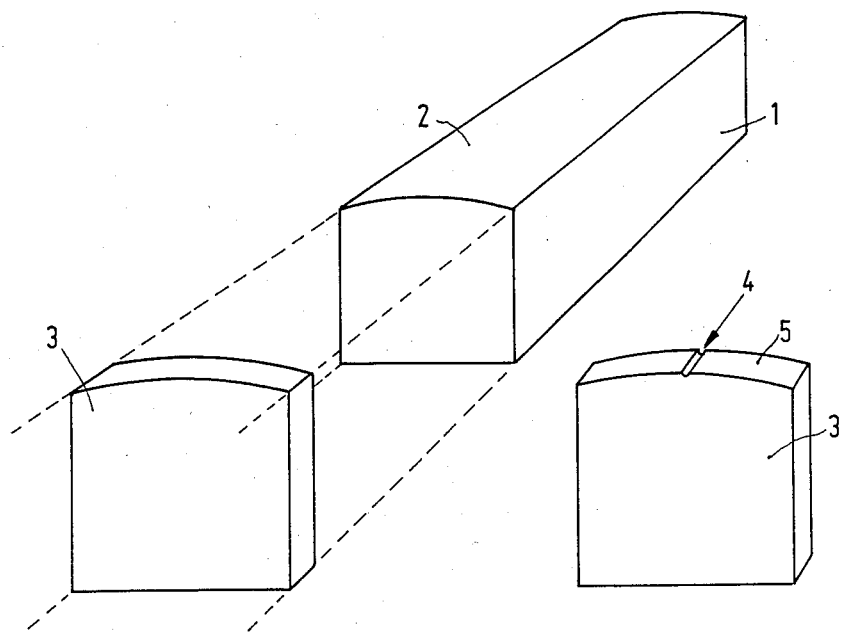
FIG. 1a shows a core block for manufacturing magnetic head cores, and a magnetic head core as cut off.
FIG. 1b shows a magnetic head core during a manufacturing stage.

An initial core block 1 is formed from a monolithic rod of monocrystalline Mn-Zn ferrite. The rod 1 has a future tape contact face 2. A plurality of magnetic head cores 3, having the dimensions 3×3×0.2 mm is sawn from this rod (FIG. 1). The magnetic head cores 3 may either have a smooth tape contact face (FIG. 1a) or a tape contact face in which a notch 4 is provided (FIG. 1b). In the later case the curved face 2 of the rod 1 is provided with a longitudinal scratch, for example, using a conical diamond stylus prior to the rod being sawn into pieces. To provide the scratch, a stylus pressure of up to 10 g and a relative rate of movement of 200 $\mu$m/sec is sufficient. The magnetic head cores 3 may subsequently be locally constricted on the side of the tape contact face 5.

Figure 2A:
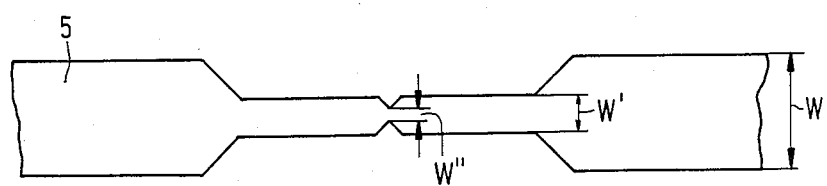
FIGS. 2a and 2b are plan views of two different magnetic head cores during a subsequent manufacturing stage.
Figure 2B:
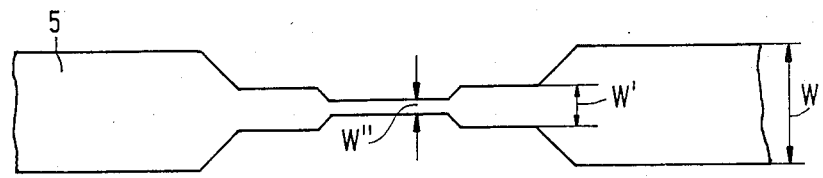

FIG. 2a is a plan view of part of a locally constricted tape contact face 5. FIG. 2b shows an alternative form of a locally constricted tape contact face 5. In both cases the width W of the initial core is 200 $\mu$m. It is constricted to a width W' of 60 $\mu$m in a first stage and in a second stage to a width W" of 23 $\mu$m which corresponds to the track width.

Figures 3, 4:
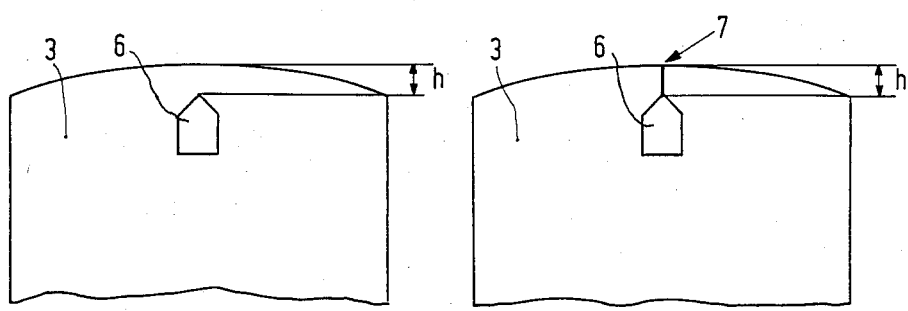
FIG. 3 is a side view of a magnetic head core having a winding aperture.
FIG. 4 is a side view of a magnetic head core having a winding aperture over which a fracture is generated.

When providing a winding aperture 6 using a focused laser in such locally constricted cores 3, a fracture 7 may be generated over the winding aperture 6 (FIG. 3 and FIG. 4, respectively). A fracture is easily produced when the core 3 is provided with a scratch 4 on the side of the tape contact face 5 (FIG. 1b). SEM pictures have provided that the fracture faces are perfect mirror surfaces.

A suitable laser both for constricting the head cores and for providing the winding aperture is an Nd-YAG laser having an effective spot diameter of 10 $\mu$m.

Figure 5:
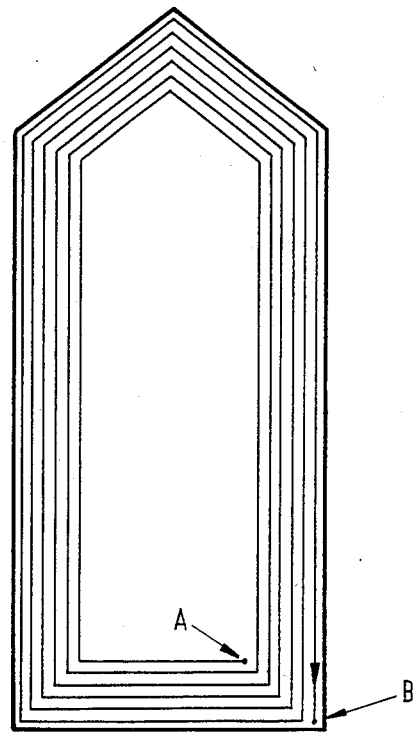
FIG. 5 shows the path to be followed by a laser beam for providing a winding aperture.

FIG. 5 shows the path followed by the laser spot in a successful experiment of providing a head core cut from a one-piece initial block with a winding aperture. The point where the path of the laser spot begins is denoted by A and the end is denoted by B. The laser is used to gradually decrease the distance between the winding aperture and the contact face until the fracture is generated.

When the gap height h is less than 40 to 50 $\mu$m, a fracture 7 is generally produced in the head core material during the laser process of providing the winding aperture 6 (FIG. 4). For gap heights h of more than 40 to 50 $\mu$m, there is generally no fracture during the laser process. By producing a temperature gradient across the head core 3, a fracture 7 may be generated afterwards.

Figure 6:
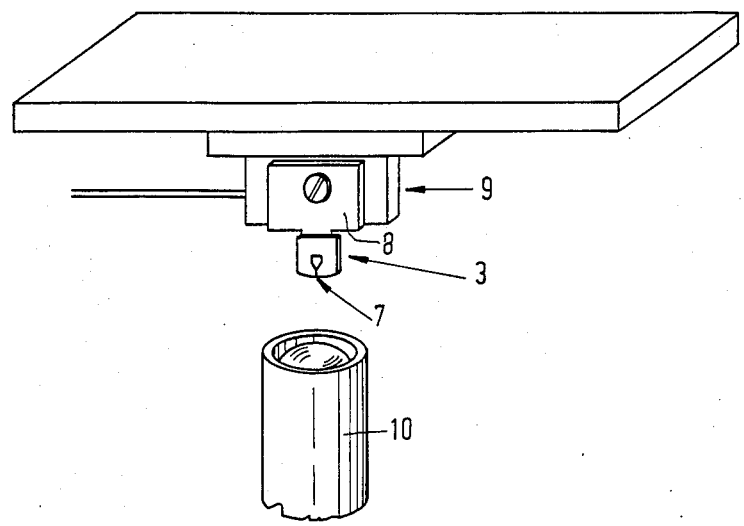
FIG. 6 shows a device for opening and checking the length of the gap in a head core.
Figure 7:
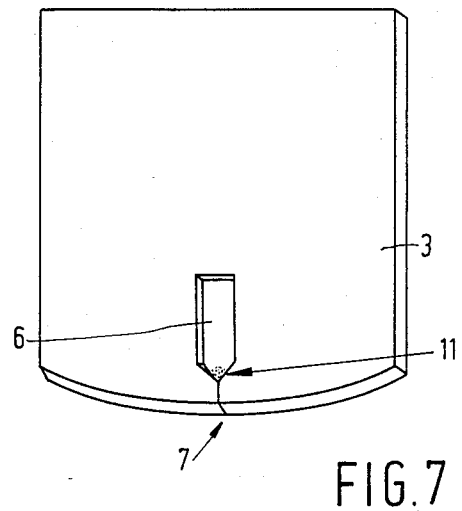
FIG. 7 shows a head core having a gap obtained by means of a fracture mechanism.

To separate the fracture faces, the application of a temperature gradient across the head core is required. In order to realise a 0.3 $\mu$m distance between the fracture faces (a gap length of 0.3 $\mu$m is a requirement in presentday video recording systems) it was necessary in a head core having the aforementioned dimensions to heat the side remote from the gap to a temperature of 70° C. To this end the head core 3 is sealed to a copper holder 8 which in turn is attached to a small heating palte 9 (FIG. 6). When the head core 3 is heated in this manner, a temperature gradient is produced across the head core. The fracture 7 is inspected (with the aid of a microscope 10) to ascertain when it has opened to the desired width. When this is the case, the temperature is maintained constant and a small quantity of a bonding agent 11, for example an epoxy adhesive, is applied in the winding aperture 6 (FIG. 7). The bonding agent 11 penetrates the gap 7 formed between the fracture faces and is cured prior to or during subsequent cooling. Gaps having a gap length of 0.2 to 0.3 $\mu$m have been realised in this manner.

What is claimed is:

1. A method of manufacturing magnetic head cores in which a plurality of magnetic head cores is cut from a pre-processed ferrite core block, said block having a surface representing the future tape contact faces of the respective head cores, said method comprising the following steps:
    cutting the individual head cores from said core block,
    providing a winding aperture in each magnetic head core at a distance from the future tape contact face, which distance is at least substantially equal to the desired gap height, said winding aperture being provided by means of a laser,
    generating a fracture in a cross-section of the core located between the future tape contact face and the winding aperture, said fracture being generated while providing said winding aperture,
    providing a non-magnetic material in liquid form between the fracture faces,
    converting the non-magnetic material to solid form while maintaining the fracture faces at a predetermined distance from each other.

2. A method as in claim 1 wherein said surface of the core block which represents the future tape contact faces of the respective head cores is provided with a longitudinal notch where the minimum distance between the contact face and the winding aperture will be present in each head core, said notch being provided prior to cutting the individual head cores from said core block.

3. A method as in claim 1 wherein said laser is used to gradually decrease the distance between the winding aperture and the contact face until said fracture is generated.

4. A method as in claim 1 wherein the fracture is generated by providing a temperature gradient across the head core.

5. A method as in claim 1 wherein the fracture faces are kept at said predetermined distance from each other by maintaining a temperature gradient across the magnetic head core.

6. A method as in claim 1 wherein the non-magnetic material is an epoxy resin.

7. A method as in claim 1 wherein the tape contact face is constricted after providing said non-magnetic material between said fracture faces.

8. A method as in claim 1 wherein the tape contact face is constricted prior to generating said fracture.

* * * * *